(12) United States Patent
Schultz et al.

(10) Patent No.: US 9,321,871 B2
(45) Date of Patent: Apr. 26, 2016

(54) WATER INSOLUBLE COPOLYMER INCLUDING PENDANT ARYL EPOXIDE GROUPS

(71) Applicants: Rohm and Haas Company, Philadelphia, PA (US); Dow Global Technologies LLC, Midland, MI (US)

(72) Inventors: Alfred K. Schultz, Maple Glen, PA (US); Gregoire Cardoen, Blue Bell, PA (US); William I. Harris, Frankenmuth, MI (US); William J. Harris, Lake Jackson, TX (US); Charles R. Marston, Midland, MI (US); David J. Moll, Midland, MI (US)

(73) Assignees: Dow Global Technologies LLC; Rohm and Haas Company

( * ) Notice: Subject to any disclaimer, the term of this patent is extended or adjusted under 35 U.S.C. 154(b) by 0 days.

(21) Appl. No.: 14/426,636

(22) PCT Filed: Oct. 7, 2013

(86) PCT No.: PCT/US2013/063637
§ 371 (c)(1),
(2) Date: Mar. 6, 2015

(87) PCT Pub. No.: WO2014/058756
PCT Pub. Date: Apr. 17, 2014

(65) Prior Publication Data
US 2015/0259456 A1    Sep. 17, 2015

Related U.S. Application Data

(60) Provisional application No. 61/711,767, filed on Oct. 10, 2012.

(51) Int. Cl.
| | |
|---|---|
| C08F 2/18 | (2006.01) |
| C08F 212/14 | (2006.01) |
| B01J 39/20 | (2006.01) |
| B01J 41/14 | (2006.01) |
| C08F 212/36 | (2006.01) |
| C08F 224/00 | (2006.01) |

(52) U.S. Cl.
CPC ............... *C08F 224/00* (2013.01); *B01J 39/20* (2013.01); *B01J 41/14* (2013.01); *C08F 2/18* (2013.01)

(58) Field of Classification Search
CPC .......... C08F 2/18; C08F 224/00; B01J 39/20; B01J 41/14
USPC .......................................................... 521/25
See application file for complete search history.

(56) References Cited

U.S. PATENT DOCUMENTS

| | | | |
|---|---|---|---|
| 2,768,182 A * | 10/1956 | Burk .................... | C07D 303/04 549/512 |
| 2,807,599 A | 9/1957 | Burk et al. | |
| 3,998,924 A | 12/1976 | Jones et al. | |
| 4,031,038 A | 6/1977 | Grinstead et al. | |
| 4,098,867 A | 7/1978 | Grinstead et al. | |
| 4,240,971 A | 12/1980 | Breslow | |
| 4,256,840 A | 3/1981 | Meitzner et al. | |
| 4,444,961 A | 4/1984 | Timm | |
| 4,451,375 A | 5/1984 | Grinstead | |
| 4,623,706 A | 11/1986 | Timm et al. | |
| 4,666,673 A | 5/1987 | Timm | |
| 4,756,989 A * | 7/1988 | Ai ......................... | C08F 212/14 430/272.1 |
| 4,839,261 A * | 6/1989 | Nakazaki ................ | G03F 7/033 430/270.1 |
| 5,112,837 A | 5/1992 | Burrows et al. | |
| 5,141,965 A | 8/1992 | Pike | |
| 5,182,026 A | 1/1993 | Pike | |
| 5,231,115 A | 7/1993 | Harris | |
| 5,244,926 A | 9/1993 | Harris et al. | |
| 6,180,691 B1 | 1/2001 | Cheng et al. | |
| 6,602,602 B1 | 8/2003 | Crovello | |
| 2008/0319097 A1 | 12/2008 | Johannsen et al. | |

FOREIGN PATENT DOCUMENTS

| | | |
|---|---|---|
| FR | 2457659 | 1/1986 |
| FR | 2604534 | 4/1988 |
| HU | 596487 | 12/1987 |
| WO | 2014058755 | 4/2014 |

OTHER PUBLICATIONS

Jones, et al., Facile synthesis of epoxystyrene and its copolymerization with styrene by living free radical and atom transfer radical strategies, Polymer 40 (1999) 2411-2418.

* cited by examiner

*Primary Examiner* — Michael M Bernshteyn

(57) ABSTRACT

A water-insoluble copolymer including an epoxide containing structural unit represented by Formula (I), wherein: the epoxide containing group is positioned meta, ortho or para on the ring relative to the bond linkage with the polymer backbone; L is an optional linking group; and $R_1$, $R_2$ and $R_3$ are independently selected from: hydrogen, or a substituted or unsubstituted hydrocarbyl group.

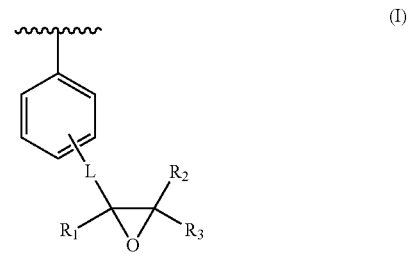

(I)

7 Claims, No Drawings

WATER INSOLUBLE COPOLYMER INCLUDING PENDANT ARYL EPOXIDE GROUPS

FIELD

The invention is directed toward water insoluble copolymers including aryl epoxide groups along with solid supports, ion exchange resins and chelating resins derived therefrom.

INTRODUCTION

Polymeric ion exchange resins have been used in various industrial, municipal and residential applications for over fifty years. A dominant type of such resins are formed as crosslinked copolymer beads ("particles") via suspension as described by F. Helfferich in Ion Exchange, (McGraw-Hill 1962) at pp. 35-36. In a typical embodiment, a monovinylidene monomer (e.g. styrene), a crosslinking monomer (e.g. divinylbenzene) and an initiator are combined in suspending medium which may optionally contain one or more suspending agents. Polymerization is initiated by heating the suspension until reaching a desired degree of conversion of monomer to polymer. Representative polymerization techniques are described in U.S. Pat. Nos. 4,256,840, 4,444,961, 4,623,706, 4,666,673 and 5,244,926. After polymerization, the copolymer bead may be functionalized by reaction with a functionalizing agent, e.g. chloromethylation followed by amination.

Water-insoluble chelating resins based upon crosslinked copolymers including pendent methyleneaminopyridine groups are also well known in the art, e.g. for use in hydrometallurgical applications such as the recovery of heavy metals (e.g. copper, nickel, chromium, cobalt, etc.). U.S. Pat. Nos. 3,998,924, 4,031,038, 4,098,867 and 4,451,375, 5,112, 837, 5,141,965 and 5,182,026 each describe examples of such chelating resins including the incorporation of methyleneaminopyridine functional groups comprising picolylamine moieties. DOWEX™ M4195 and XUS-43578 brand chelating resins are commercial examples of such resins. U.S. Pat. No.5,231,115 further describes a similar macroporous, crosslinked styrene-divinylbenzene copolymer matrix comprising an interpenetrating polymer network (IPN).

Copolymers used as solid supports to prepare oligomers and polypeptides are described in U.S. Pat. Nos. 7,348,391 and 7,700,706. The copolymer is derived from a reaction mixture including a functionalized monomer such as propanoyloxystyrene or acetoxystyrene. U.S. Pat. Nos. 5,391, 667 and 6,335,438 describe similar type of solid supports. A variety of suspension polymerization techniques may be used to prepare such copolymers. See for example: G. Vladisavljevic et al., Recent Developments in Manufacturing Emulsions and Particulate Products using Membranes, Advances in Colloid and Interface Sciences 113 (2005) 1-20, Elsevier; GB 2385008 and US2012/0175798. Particles or beads formed from such techniques typically have smaller sizes as compared with the aforementioned ion exchange and chelating resins, e.g. from about 50 to 200 microns versus 200 to 1000 microns.

SUMMARY

In one embodiment, the invention includes a water-insoluble copolymer including an epoxide containing structural unit represented by Formula (I):

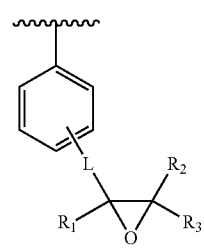

wherein: the epoxide containing group is positioned meta, ortho or para on the ring relative to the bond linkage with the polymer backbone; L is an optional linking group; and $R_1$, $R_2$ and $R_3$ are independently selected from: hydrogen, or a substituted or unsubstituted hydrocarbyl group (preferably hydrogen or an unsubstituted alkyl, cycloalkyl or aryl group having from 1 to 9 carbon atoms). In another embodiment, the water insoluble copolymer includes an epoxide containing structural unit represented by Formula (II):

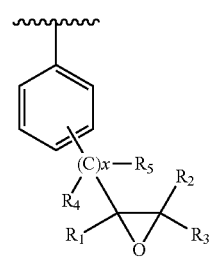

wherein: the epoxide containing group is positioned meta, ortho or para on the ring relative to the bond linkage with the polymer backbone; "x" is an integer from 0 to 9 (preferably 0); and $R_1$, $R_2$, $R_3$, $R_4$ and $R_5$ are independently selected from: hydrogen, or a substituted or unsubstituted hydrocarbyl group (preferably hydrogen or an unsubstituted alkyl, cycloalkyl or aryl group having from 1 to 9 carbon atoms).

In another embodiment, the invention includes a solid support, chelating resin or ion exchange resin derived from a reaction mixture comprising the subject copolymer with a functionalizing agent (e.g. an amine or sulfite compound).

In yet another embodiment, the invention includes the use of a chelating resin to recover heavy metals, e.g. copper.

In still another embodiment, the invention includes a method for making a water insoluble copolymer comprising the steps of conducting an aqueous suspension polymerization of a reaction mixture comprising: an initiator, a crosslinking monomer and an epoxide containing monomer represented by Formula (III):

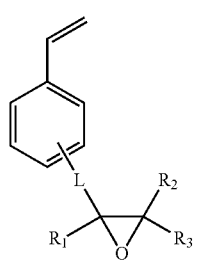

wherein: the epoxide containing group is positioned meta, ortho or para on the ring relative to the vinylidene group, and L, $R_1$, $R_2$ and $R_3$ are as defined above. In a preferred embodiment, the epoxide containing monomer is a vinylphenyl oxirane (VBMO), as represented in Formula (IV):

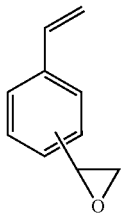

(IV)

wherein the epoxide containing group is positioned meta, ortho or para on the ring relative to the vinylidene group.

DETAILED DESCRIPTION

The water insoluble copolymers of the present invention may assume a variety of forms including films, membranes, fibers, chips and the like; however one preferred form is that of a particle (e.g. "bead") as that term is common in the field of ion exchange and chelating resins. When provided in bead form, the beads preferably have a median particle diameter from 10 to 1000 microns. The beads may have a Gaussian particle size distribution but preferably have a relatively uniform particle size distribution, i.e. "monodisperse" that is, at least 90 volume percent of the beads have a particle diameter from about 0.9 to about 1.1 times the volume average particle diameter.

While the subject copolymers may be made by way of a variety of polymerization techniques, suspension polymerization techniques are preferred. Suspension polymerization involves providing a finely divided organic phase including monomers represented by Formula III along with other optional monomers including monovinylidene monomers described below, crosslinking monomers such as divinylbenzene, an initiator (e.g. free radical type) and, optionally, phase-separating diluents ("swelling solvent" such as methylal, N-methylpyrrolidone, dimethylformamide, toluene, and dimethylacetamide). The suspending medium may also contain one or more suspending agents (e.g. gelatin, polyvinyl alcohol, magnesium hydroxide, hydroxyethylcellulose, methylhydroxyethylcellulose methylcellulose, and carboxymethyl methylcellulose), latex inhibitors (e.g. a sodium dichromate), and buffer agents (e.g. boric acid, sodium borate), as are commonly used in the art. Polymerization may be optionally initiated by heating the suspension. The resulting crosslinked copolymer may be macroporous or gel-type. The terms "gel-type" and "macroporous" are well-known in the art and generally describe the nature of the copolymer particle porosity. The term "macroporous," sometimes also referred to as "macroreticular," describes a copolymer having both macropores and mesopores. The terms "microporous," "gellular," "gel" and "gel-type" are synonyms that describe copolymers having pore sizes less than about 20 Angstroms (Å), while macroporous copolymers have both mesopores of from about 20 (Å) to about 500 (Å) and macropores of greater than about 500 (Å). Gel-type and macroporous copolymer particles, as well as their preparation are further described in U.S. Pat. No. 4,256,840 and U.S. Pat. No. 5,244,926. Other suitable polymerization techniques are described in U.S. Pat. Nos. 4,444,961, 4,623,706, 4,666,673, 5,244,926, and G. Vladisavljevic et al., Recent Developments in Manufacturing Emulsions and Particulate Products using Membranes, Advances in Colloid and Interface Sciences 113 (2005) 1-20.

A representative listing of optional monovinylidene monomers distinct from the subject monomer of Formula (III) and (IV), i.e. not containing epoxide groups, is provided in Polymer Processes, edited by Calvin E. Schildknecht, published in 1956 by Interscience Publishers, Inc., New York, Chapter III, "Polymerization in Suspension" at pp. 69-109. Table II (pp. 78-81) of Schildknecht lists diverse types of monomers which are suitable in practicing the present invention. Of the monomers listed, water-insoluble (or only slightly soluble, e.g. less than 0.1 wt. percent) monovinylidene monomers including the monovinylidene aromatics such as styrene and substituted styrene are preferred. The term "substituted styrene" includes substituents of either/or both the vinylidene group and phenyl group of styrene and include: vinyl naphthalene, alpha alkyl substituted styrene (e.g., alpha methyl styrene) alkylene-substituted styrenes (particularly monoalkyl-substituted styrenes such as vinyltoluene and ethylvinylbenzene) and halo-substituted styrenes, such as bromo or chlorostyrene and vinylbenzylchloride. Other applicable monomers include monovinylidene non-styrenics such as: esters of $\alpha,\beta$-ethylenically unsaturated carboxylic acids, particularly acrylic or methacrylic acid, methyl methacrylate, isobornylmethacrylate, ethylacrylate, and butadiene, ethylene, propylene, acrylonitrile, and vinyl chloride; and mixtures of one or more of said monomers. Preferred monovinylidene monomers include styrene and substituted styrene such as ethylvinylbenzene. The term "monovinylidene monomer" is intended to include homogeneous monomer reaction mixtures and mixtures of different types of monomers.

Examples of suitable crosslinking monomers (i.e., polyvinylidene compounds) include polyvinylidene aromatics such as divinylbenzene, divinyltoluene, divinylxylene, divinylnaphthalene, trivinylbenzene, divinyldiphenylsulfone, as well as diverse alkylene diacrylates and alkylene dimethacrylates. Preferred crosslinking monomers are divinylbenzene, trivinylbenzene, and ethylene glycol dimethacrylate. The terms "crosslinking agent," "crosslinker" and "crosslinking monomer" are used herein as synonyms and are intended to include both a single species of crosslinking agent along with combinations of different types of crosslinking agents.

Free-radical initiators may be any one or a combination of conventional initiators for generating free radicals in the polymerization of ethylenically unsaturated monomers. Representative initiators are UV radiation and chemical initiators, such as azo-compounds including azobisisobutyronitrile; and peroxygen compounds such as benzoyl peroxide, t-butylperoctoate, t-butylperbenzoate and isopropylpercarbonate. Other suitable initiators are mentioned in U.S. Pat. Nos. 4,192,921, 4,246,386, and 4,283,499. The free-radical initiators are employed in amounts sufficient to induce polymerization of the monomers in a particular monomer reaction mixture. The amount will vary as those skilled in the art can appreciate and will depend generally on the type of initiators employed, as well as the type and proportion of monomers being polymerized. Generally, an amount of from about 0.02 to about 2 weight percent is adequate, based on total weight of the monomer reaction mixture.

Conventional batch suspension polymerization techniques (e.g. using vibratory membranes) are suited for making smaller sized beads (e.g. 5-200 micron) used in solid support applications. Conventional batch suspension polymerization techniques (e.g. vibrated jet technology) are suited for making medium to large beads (e.g. 200-1000 microns) used in ion exchange and chelating resins. Seeded polymerization techniques are utilized for larger beads from smaller beads (e.g. 50-1000 micron) used in solid supports, ion exchange, and chelating ion resins. With so-called "seeded techniques," a seed polymer component may be formed from a reaction mixture comprising from 5 to 99 weight percent, more preferably from 30 to 95 wt % and in some embodiments, from 50 to 95 wt % of the subject monomer as represented by Formula (III). The reaction mixture preferably includes from 0 to 30 wt %, more preferably from 0.5 to 10 wt % and in some embodiments, from 2 to 6 wt % of crosslinking monomer. In those embodiments where an "optional" monovinylidene monomer is also included, the monovinylidene monomer preferably comprises a styrene or substituted styrene (e.g. ethylvinylbenzene) monomer in an amount of from 0 to 65 wt %, and in some embodiments, from 5 to 50 wt %. The proportion of crosslinking monomer in the copolymer seed particles is preferably sufficient to render the particles insoluble in subsequent polymerization steps (and also on conversion to an ion-exchange resin), yet still allow for adequate imbibition of an optional phase-separating diluent and monomers of a second monomer reaction mixture. Generally, a suitable amount of crosslinking monomer in the reaction mixture used to form the seed particles is minor, i.e., desirably from about 0.01 to about 10 molar percent, preferably from about 0.1 to about 5 molar percent based on total moles of monomers in the first monomer reaction mixture used to prepare the seed particles. As used herein, the term "polymer component" refers to the polymeric material resulting from a distinct polymerization step. For example, in a preferred embodiment of the present invention, the subject copolymers are "seeded" resins; that is, the resin is formed via a seeded process wherein a copolymer (preferably crosslinked) seed is first formed and is subsequently imbibed with monomer and subsequently polymerized. Additional monomer may be subsequently added during the polymerization process (i.e. "continuous addition" or "con-add"). The formation of the seed particles constitutes a distinct polymer component. Similarly, the process step of imbibing and polymerizing a monomer reaction mixture into the seed constitutes yet another polymer component. If used, the subsequent continuous addition of a monomer reaction mixture commonly used to "grow up" the seed also constitutes a distinct polymer component. Except as specifically described, the constituents of each polymer component may be the same or different. Moreover, the monomer reaction mixture used during a polymerization step need not be homogeneous; that is, the ratio and type of monomers may be varied. The term "polymer component" is not intended to mean that the resulting resin have any particular morphology other than an interpenetrating polymer network; however, the present resins may have a "core-shell" type structure as is described in U.S. Pat. No. Re 34112. Each polymer component preferably contributes more than about 5 weight percent, and more preferably at least 10 weight percent of the final IPN copolymer particle. Typically, the resins comprise two or three polymer components, e.g. a seed component, an imbibe component, and/or a continuous addition component. Those skilled in the art will appreciate that different or additional combinations of polymer components may be used, e.g., multiple con-add components may be utilized. The first, second, third, etc., polymer components do not necessarily correspond to an order of addition. That is, the "first polymer component" does not necessarily correspond to the polymer component which is first polymerized, e.g., a seed particle. The terms "first," "second," etc. are only used to distinguish one component from another, not to designate an order of addition.

The first monomer reaction mixture used to prepare the seed particles is advantageously suspended within an agitated suspending medium comprising a liquid that is substantially immiscible with the monomers, (e.g. preferably water). Generally, the suspending medium is employed in an amount from about 35 to about 70 and preferably from about 35 to about 50 weight percent based on total weight of the monomer reaction mixture and suspending medium. Various suspending agents are conventionally employed to assist with maintaining a relatively uniform suspension of monomer droplets within the suspending medium. Illustrative suspending agents are gelatin, polyvinyl alcohol, magnesium hydroxide, hydroxyethylcellulose, methylhydroxyethylcellulose methylcellulose, and carboxymethyl methylcellulose. Other suitable suspending agents are disclosed in U.S. Pat. No. 4,419,245. The amount of suspending agent used can vary widely depending on the monomers and suspending agents employed. Latex inhibitors such as sodium dichromate may be used to minimize latex formation.

Polymerization of the first monomer reaction mixture may be conducted to a point short of substantially complete conversion of the monomers to copolymer or alternatively, to substantially complete conversion. If incomplete conversion is desired, the resulting partially polymerized seed particles advantageously contain a free-radical source therein capable of initiating further polymerization in subsequent polymerization stages. The term "free-radical source" refers to the presence of free-radicals, a residual amount of free-radical initiator or both, which is capable of inducing further polymerization of ethylenically unsaturated monomers. In such an embodiment of the invention, it is preferable that from about 20 to about 95 weight percent of the first monomer reaction mixture, based on weight of the monomers therein, be converted to copolymer and more preferably from about 50 to about 90 weight percent. Due to the presence of the free radical source, the use of a free-radical initiator in a subsequent polymerization stage would be optional. For embodiments where conversion of the first monomer reaction mixture is substantially complete, it may be necessary to use a free-radical initiator in subsequent polymerization stages.

The seed particles may be of any convenient size. In general, the seed particles desirably have a volume average particle diameter of from about 15 to about 1000 microns, preferably from about 150 to about 800 microns, and more preferably from about 200 to about 600 microns. The distribution of the particle diameters may be Gaussian or uniform (e.g. at least 90 volume percent of the particles have a particle diameter from about 0.9 to about 1.1 times the volume average particle diameter).

As previously described, copolymer particles may be prepared by providing a plurality of the seed particles and thereafter, adding a second monomer reaction mixture such that the mixture is imbibed by the seed particles and polymerization is conducted therein. This step is preferably conducted as a batch-seeded process or as an in situ batch-seeded process, as described below. The second monomer reaction mixture may also be added intermittently or continuously under polymerizing conditions, such as described in U.S. Pat. No. 4,564,644.

In the so-called "batch-seeded" process, seed particles comprising from about 2 to about 50 weight percent of the copolymer are preferably suspended within a continuous suspending medium. A second monomer reaction mixture containing a free radical initiator is then added to the suspended seed particles, imbibed thereby, and then polymerized. Although less preferred, the seed particles can be imbibed with the second monomer reaction mixture prior to being suspended in the continuous suspending medium. The second monomer reaction mixture may be added in one amount or in stages. The second monomer reaction mixture is preferably imbibed by the seed particles under conditions such that substantially no polymerization occurs until the mixture is substantially fully imbibed by the seed particles. The time required to substantially imbibe the monomers will vary depending on the copolymer seed composition and the monomers imbibed therein. However, the extent of imbibition can generally be determined by microscopic examination of the seed particles, or suspending media, seed particles and monomer droplets. The second monomer reaction mixture desirably contains from about 0.5 to about 25 molar percent, preferably from about 2 to about 17 molar percent and more preferably 2.5 to about 8.5 molar percent of crosslinking monomer based on total weight of monomers in the second monomer reaction mixture with the balance comprising a monovinylidene monomer; wherein the selection of crosslinking monomer and monovinylidene monomer are the same as those described above with reference to the preparation of the first monomer reaction mixture, (i.e. seed preparation). Optionally, a polymerization initiator can be added with the second monomer reaction mixture where the seed particles do not contain an adequate free radical source or where additional initiator is desired. In this embodiment, seed preparation and subsequent polymerization stages are conducted in-situ within a single reactor. A second monomer reaction mixture is then added to the suspended seed particles, imbibed thereby, and polymerized. The second monomer reaction mixture may be added under polymerizing conditions, but alternatively may be added to the suspending medium under conditions such that substantially no polymerization occurs until the mixture is substantially fully imbibed by the seed particles. The composition of the second monomer reaction mixture preferably corresponds to the description previously given for the batch-seeded embodiment.

The subject copolymer particles may also include interpenetrating polymer networks. The term "interpenetrating polymer network" (IPN) describes a material containing at least two polymers, each in network form wherein at least one of the polymers is synthesized and/or crosslinked in the presence of the other. The polymer networks are physically entangled with each other and in some embodiments may be also be covalently bonded. Characteristically, IPNs swell but do not dissolve in solvent nor flow when heated. IPNs using polystyrene/polystyrene as models for ion exchange resin matrices were first introduced in the 1960s; see for example, J. R. Millar, *Journal of Chemical Society*, pg. 1311 (1960); pg. 1789 (1962); and pg. 218 (1963). IPNs have also been described in: C. H. Sperling, "Interpenetrating Polymer Networks and Related Materials", Plenum Press, NY, (1981); and in "Sulfonic Acid Resins with Interpenetrating Polymer Networks," D. Klempner and K. C. Rrisch, ed., *Advances in Interpenetrating Polymer Networks*, Volume II, Technomic Publishing Co. Inc., pg. 157-176, Lancaster, Basel (1990). Ion exchange resins including IPNs have been commercially available for many years. Examples of such resins along with techniques for their preparation are provided in: U.S. Pat. Nos. 4,419,245, 4,564,644, U.S. Pat. No. 4,582,859, 5,231,115, 5,834,524, 6,251,996, 6,924,317; US 2002/0042450 and US 2008/0237133. Commercial examples of IPN gel-type ion exchange resins are described in: *Ion Exchange at the Millennium—Proceedings of IEX* 2000, ed. J A Greg, Imperial College Press, London (2000).

The subject copolymer may be subsequently functionalized to form a chelating or ion exchange resin (including cationic and anionic) by reaction with a functionalizing agent. Representative examples of functionalizing agents useful for creating ion exchange resins of the present invention include but are not limited to sodium sulfite (i.e. to prepare strong acid cation exchange resins of the sulfonic acid type), tertiary amines (i.e. to prepare strong base anion exchange resins of the quaternary amine type), carboxylic acid groups (i.e. to prepare weak acid cation exchange resins), and primary or secondary amines (i.e. to prepare weak base anion exchange resins). A few representative functionalizing reaction pathways are provided below utilizing copolymer prepared using 2-(4-vinylphenyl)oxirane, ("VBMO").

In the case of strong base anion exchange resins, particularly suitable amines include alkylamines containing lower alkyl groups, particularly $C—C_8$ alkyl groups, including combinations of different species. In general, the alkylamine is one in which the alkyl groups are either linear or branched or mixtures thereof, and the sum of the carbon atoms is between 3 and 21. Preferably, the alkyl amines are selected from: dimethyl amine, trimethylamine, tripropylamine, tributylamine and triamylamine, and mixtures thereof. Other suitable amines include mixtures of triethylamine and trioctylamine and mixtures of tripropylamine and triamylamines.

In the case of chelating resins, particularly preferred amines include aminopyridines, e.g. 2-picolylamine, bis-(2-picolylamine), N-(2-hydroxyethyl)-2-picolylamine, N-(2-hydroxypropyl)-2-picolylamine, N-methyl-2-picolylamine, and N-(2-methylaminoethyl)-2-picolylamine. Such picolylamines may be prepared, for example by hydrogenation of 2-cyanopyridine or by reaction of 2-picolyl chloride with an appropriate amine or alkylenepolyamine such as methylamine, monoethanolamine, ethylenediamine, propylenediamine, etc. In an optional subsequent functionalizing step, the picolylamine containing chelating resin may be subsequently reacted with an epoxide containing compound (e.g. ethylene oxide), resulting in reaction with the secondary amine of the picolylamine moiety to form a tertiary amine, both of which result in less reactivity. Further reactions with propylene oxide results in the corresponding hydroxylalkylated tertiary amine. Thus, it is possible to tune the hydrophilicity of the exchange or chelating site by selecting the proper epoxide functionalizing agent. Residual functionalizing agents can be removed from the resin by both steam-distillation and/or acidification.

Representative Functionalization Reactions

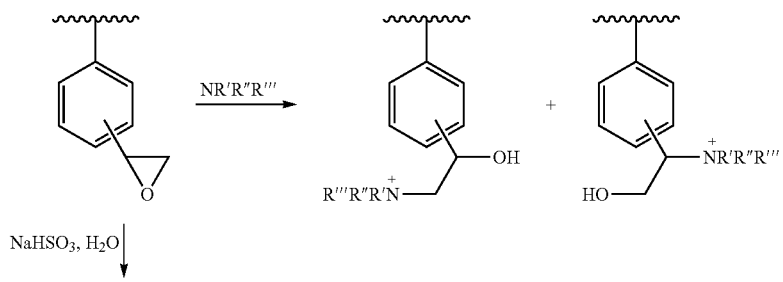

-continued

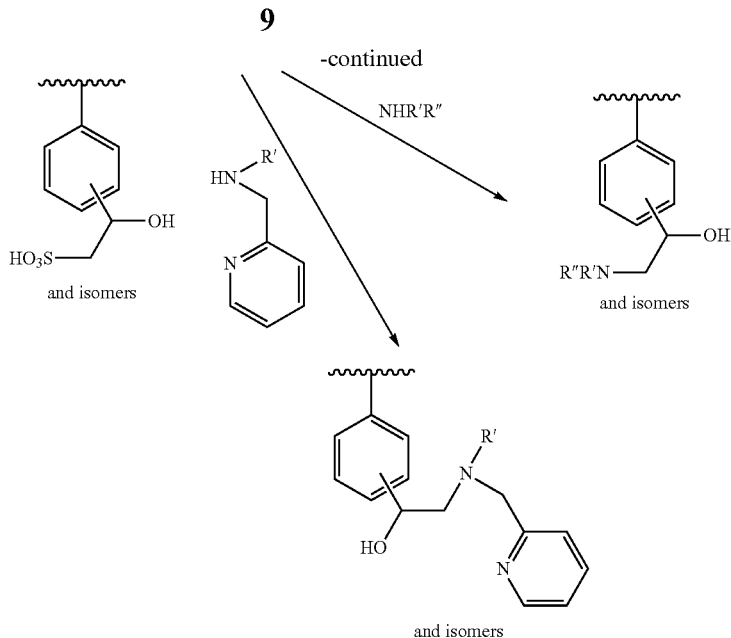

and isomers

The chelating resins of the present invention are water-insoluble and preferably comprise gel-type IPN crosslinked copolymers including a plurality of pendant methyleneaminopyridine groups. In preferred embodiments, the pendant methyleneaminopyridine groups are capable of chelating with various metals including one or more of: copper, nickel, cobalt, chromium, cadmium, iron, uranium, zinc, silver, gold, mercury, platinum, vanadium and molybdenum. Representative aminopyridine groups and methods for functionalizing crosslinked copolymer matrixes therewith are described in detail in U.S. Pat. Nos. 3,998,924, 4,031,038, 4,098,867, 4,451,375, 5,112,837, 5,141,965 and 5,182,026. The subject chelating resins are useful for removing and/or recovering various metals from aqueous streams. In one preferred application, the subject resins are used to recover heavy metals from hydrometallurgical liquors. Non-limiting examples of such metals include: copper (II), nickel, iron (II), iron (III), zinc, cobalt (II) and chromium, cadmium, uranium (VI), silver, gold, platinum, vanadium and molybdenum, but particularly copper and nickel. The basic technique for recovering such metals is described in U.S. Pat. No. 2,980,607. In general, an aqueous stream of the hydrometallurgical leach liquor is passed thru a bed of the chelating resin. Metal is subsequently recovered from the resin by elution, e.g. accomplished by use of a strong acid. Other applications for the subject resins include the removal of metals from industrial process streams, such as the waste water associated with chromium plating processes. Metal may be recovered from such resins by standard elution techniques and the resin may be regenerated and reused. In still other embodiments, the ion exchange resin is not regenerated but is disposed of (e.g. burial in a landfill) or destroyed (e.g. incinerated) once loaded with the metal. These non-regenerated embodiments are consistent with treatment of water sources including relatively low concentrations of metals, (e.g. less than about 1500 ug/L), such as treatment of ground water, wastewater prior to discharge and drinking water applications. In such embodiments, the treatment and handling of the metal containing regenerate liquid can be avoided. The apparatus or vessel containing the resin is not particularly limited and may vary upon the specific application, scale of operation, source of water and metal concentration. Examples of applicable embodiments range from column-type beds including several cubic meters of ion exchange resin to disposable cartridges containing only a few kilograms of ion exchange resin.

EXAMPLES

The following examples are intended to illustrate embodiments of the invention and should not be construed as limiting the scope of the appended claims 1. Generation of Aqueous Phase for the Synthesis of VBMO-Containing Beads by Suspension Polymerization:

Pharmagel (protective colloid, 0.55 g, 0.21 wt % commercially available from Rousselot) was dissolved in 120 mL of deionized water at 40° C. Boric acid (0.65 g, 0.25 wt %) followed by a 50% aqueous NaOH (0.7 g, 0.27 wt %) were mixed into 133.5 g of deionized water to create a buffer solution. The Pharmagel solution was added to the buffer solution, mixed and polyallyl dimethyl ammonium chloride (4.70 g, 1.81 wt %) was added. After mixing for a few minutes, pH was adjusted with 50% aqueous NaOH to reach a pH between 9.7 and 10.0.

2. Gel Copolymer Synthesis (50:50 Styrene:VBMO):

In a test tube, divinyl benzene (DVB) (45 wt % m-divinylbenzene, 18 wt % p-divinylbenzene, 35.3 wt % ethylvinylbenzene, 0.069 g, 6.39%), Styrene (0.5 g, 46.15 wt %), VBMO (78.23 wt % VBMO, 11.7 wt % 2-(3-ethylphenyl)oxirane (EVBO)—0.5 g, 46.15 wt %) and benzoyl peroxide (0.014 g, 1.31 wt %) were added in this order to the aqueous phase (4.33 g) created in Example 1. The test tube was placed in a polymerization vessel. The reaction mixture was stirred at 700 rpm, and the following temperature ramp was applied: 25° C. for 30 min, ramp to 79° C. over 70 min, hold at 79° C. for 135 min, ramp to 110° C. over 60 min and hold at 110° C. for 3 hrs, then cool the mixture to ambient temperature. The resulting beads were isolated by filtration, rinsed several times with deionized water and stored without further treatment. Transparent beads were obtained and were analyzed by FT-IR and optical microscopy. FT-IR (cm$^{-1}$): 3400 (hydroxyl vibration), 879.0, 832.1, 794.7 (epoxy vibration).

3. Gel Copolymer Synthesis (VBMO Only):

In a test tube, DVB (0.069 g, 6.39%), VBMO (78.23 wt % VBMO, 11.7 wt % 2-(3-ethyl phenyl)oxirane (EVBO)—1 g, 92.3 wt %) and benzoyl peroxide (0.014 g, 1.31 wt %) were added in this order to the aqueous phase (4.33 g) created in Example 1. The test tube was placed in a polymerization vessel and subject to the same reaction conditions and preparation as described with respect to Example 2. Transparent beads were obtained and were analyzed by FT-IR and optical microscopy. FT-IR ($cm^{-1}$): 3400 (hydroxyl vibration), 879.0, 832.1, 794.7 (epoxy vibration).

4. Larger Scale Gel Copolymer Synthesis:

Using the same proportions for each reagent as described in the previous example, 216.44 g of aqueous phase was placed in a 1 L Parr reactor. To this solution was added 54.11 g of organic phase. The reactor was closed, the stirrer set at 300 rpm and the same temperature profile and workup as described previously were utilized. Characterization of the copolymer was the same as the small scale batch. FT-IR ($cm^{-1}$): 3400 (hydroxyl vibration), 879.0, 832.1, 794.7 (epoxy vibration).

5. Macroporous Copolymer Synthesis with MIBC (50:50 Styrene:VBMO):

In a test tube, DVB (0.416 g, 6.39%), VBMO (78.23 wt % VBMO, 11.7 wt % EVBO—0.5 g, 35.3 wt %), styrene (0.5 g, 35.3 wt %), methylisobutyl carbinol, (0.698 g, 33.02 wt %) and benzoyl peroxide (0.019 g, 1.31 wt %) were added in this order to the aqueous phase (4.22 g) described in Example 1. The test tube was placed in a polymerization vessel and was subject to the same reaction conditions and sample preparation as described with respect to Example 2. Opaque beads were obtained and were analyzed by FT-IR and optical microscopy. FT-IR ($cm^{-1}$): 3400 (hydroxyl vibration), 879.0, 832.1, 794.7 (epoxy vibration).

6. Macroporous Copolymer Synthesis with MIBC (VBMO Only):

In a test tube, DVB (0.416 g, 6.39%), VBMO (78.23 wt % VBMO, 11.7 wt % EVBO—1 g, 70.6 wt %), methylisobutyl carbinol, (0.698 g, 33.02 wt %) and benzoyl peroxide (0.019 g, 1.31 wt %) were added in this order to the aqueous phase (4.22 g) described in Example 1. The test tube was placed in a polymerization vessel and subject to the same reaction conditions and sample preparation as described with respect to Example 2. Opaque beads were obtained and were analyzed by FT-IR and optical microscopy. FT-IR ($cm^{-1}$): 3400 (hydroxyl vibration), 879.0, 832.1, 794.7 (epoxy vibration).

7. Macroporous Copolymer Synthesis with Isooctane (50:50 Styrene:VBMO):

In a test tube, DVB (0.416 g, 6.39%), VBMO (78.23 wt % VBMO, 11.7 wt % EVBO—0.5 g, 35.3 wt %), styrene (0.5 g, 35.3 wt %), isooctane (0.698 g, 33.02 wt %) and benzoyl peroxide (0.019 g, 1.31 wt %) were added in this order to the aqueous phase (4.22 g) described in Example 1. The test tube was placed in a polymerization vessel and subject to the same reaction conditions and sample preparation as described with respect to Example 2. Opaque beads were obtained and were analyzed by FT-IR and optical microscopy. FT-IR ($cm^{-1}$): 3400 (hydroxyl vibration), 879.0, 832.1, 794.7 (epoxy vibration).

8. Macroporous Copolymer Synthesis with Isooctane (VBMO Only):

In a test tube, DVB, (0.416 g, 6.39%), VBMO (78.23 wt % VBMO, 11.7 wt % EVBO—1 g, 70.6 wt %), isooctane (0.698 g, 33.02 wt %) and benzoyl peroxide (0.019 g, 1.31 wt %) were added in this order to the aqueous phase (4.22 g) described in Example 1. The test tube was placed in a polymerization vessel and subjected to the same reaction conditions and sample preparation as described with respect to Example 2. Opaque beads were obtained and were analyzed by FT-IR and optical microscopy. FT-IR ($cm^{-1}$): 3400 (hydroxyl vibration), 879.0, 832.1, 794.7 (epoxy vibration).

9. Reaction of Trimethylamine (TMA) with VBMO Gel Copolymer (VBMO:TMA):

VBMO gel copolymer (20 mL) from Example 2 was introduced in a pressure tube. Methylal (100 mL) was added to the resin and the tube was put into a water bath, equipped with a shaker, at room temperature for 45 min, to swell the beads. The methylal was then removed with a suction wand and ~60 mL of fresh methylal was added. Trimethylamine (50.7 mL, 0.33 mol) was charged to the tube. The tube was sealed, placed in the water bath and the reaction was run at 40° C. for 4 hours. At the end of the reaction, methylal was removed and replaced with a 5 wt % HCl solution (80 mL). Upon addition of the HCl solution, the beads went from a brown color to a light yellow. After an hour at 40° C., the resin was washed several times with deionized water, until neutralized, and stored as a wet cake for further analysis. A small portion of these beads were dried overnight in a vacuum oven for FT-IR/optical microscopy analysis. FT-IR (main vibrations, $cm^-$): 3400, 1070, 954.

10. Reaction of Trimethylamine (TMA) with VBMO MR Copolymer:

VBMO MR copolymer resin (0.5 mL) was introduced in a pressure tube. Methylal (5 mL) was added to the resin and the tube was put into a water bath, equipped with a shaker, at room temperature for 45 min, to swell the beads. The methylal was then removed with a suction wand and ~5 mL of fresh methylal was added. Trimethylamine (5 mL, 0.033 mol) was charged to the tube. The tube was sealed, placed in the water bath and the reaction was run at 40° C. for 4 hours. At the end of the reaction, methylal was removed and replaced with a 5 wt % HCl solution (80 mL). Upon addition of the HCl solution, the beads went from a brown color to a light yellow. After an hour at 40° C., the resin was washed several times with deionized water until neutralized and stored as a wet cake for further analysis. A small portion of these beads were dried overnight in a vacuum oven for FT-IR/optical microscopy analysis. FT-IR (main vibrations, $cm^{-1}$): 3400, 1070, 954.

11. Reaction of Triethylamine with VBMO Gel Copolymer:

VBMO gel copolymer beads (0.5 mL) were added to a pressure tube. The beads were wetted at RT for 30 min in methylal and then 7.5 mL of fresh methylal was added. Triethylamine (4.61 g, 0.033 mol) was added to the tube and the mixture was put, as is, in the shaker at 40° C. over night. At the end of the reaction, methylal was removed and replaced with a 5 wt % HCl solution (10 mL). After an hour at 40° C., the resin was washed several times with deionized water until neutralization and stored as a wet cake.

12. Reaction of Tributylamine with VBMO Gel Copolymer:

VBMO gel copolymer beads (1 mL) were added to a glass sleeve. The beads were wetted at RT for 30 min in N-methyl pyrrolidone, (5 mL) and then tributylamine (3.13 g, 0.0131 mol) was added to the mixture and the glass sleeve was placed in the reactor at 80° C. for 3 days. At the end of the reaction, the resin was washed several times with methanol and deionized water. Analysis by FT-IR showed reaction. FT-IR (cm–1): 3400 (hydroxyl vibration), 1025, 885.0, 832.1, 794.7.

13. Reaction of Sodium Sulfite with VBMO Gel Copolymer:

VBMO gel copolymer beads (0.5 mL) were placed in a pressure tube. Sodium sulfite (4.31 g, 0.033 mol) was dissolved in 15 mL of water. The beads were wetted at RT for 30 min in methylal and then 7.5 mL of fresh methylal was added. 7.5 mL of sodium sulfite solution was added and the mixture was put, as is, in the shaker at 40° C. over night. The beads were recovered by filtration, washed with copious amount of water and stored "as is."

14. VBMO:TMA Gel Resin Characterization:

Ion exchange capacity (weight capacity (WC), volume capacity (VC), moisture holding content (MHC)) were measured according to the method described in ASTM D2187-94(2009)e1 "Standard Test Methods for Physical and Chemical Properties of Particulate Ion-Exchange Resins". The results were: WC of 3.36 eq/kg, a VC of 1.22 eq/L and an MHC of 49.4%.

15. VBMO:TMA Chloride/Hydroxide Selectivity:

A VBMO:TMA resin (20 mL) was washed with deionized water. The resin was then mixed with 200 mL of 0.1N NaOH and allowed to equilibrate overnight. The resin was filtered and the solution was titrated in triplicate with 0.5N HCl (titration volumes ~40 mL). 200 mL of the resulting solution contained 8.894 mmol of hydroxide, equating to a [OH] in the resin=11.106 mmol. The selectivity coefficient can be expressed as follows:

$$K_{OH}^{Cl} = \frac{[Cl^-]_S[OH^-]_R}{[OH^-]_S[Cl^-]_R} \text{ with:}$$

$[Cl^-]_s$=Concentration of chloride ions in solution at equilibrium $[Cl^-]_r$=Concentration of chloride ions in resin at equilibrium $[Cl^-]_s$=Concentration of hydroxyl ions in resin at equilibrium $[OH^-]_r$=Concentration of chloride ions in resin at equilibrium $K_{OH}^{Cl}$=Selectivity Coefficient A selectivity coefficient of 2.6 was found. This resin behaves closer to a Type II resin than a Type I, which was expected given its structure.

16. VBMO:TMA Thermal Stability:

AMBERJET™ 4200Cl, AMBERJET™ 4200OH, VBMO:TMA Cl, VBMO:TMA OH, AMBERLITE™ IRA 410Cl and AMBERLITE™ IRA 410OH stability was assessed by TGA-MS by heating the resins from 20° C. to 600° C. at 10° C./min. The stability of these resins was evaluated by GC-headspace at 60° C. and 100° C. over 4 days. Resins in the hydroxide form were prepared from the chloride form by percolating ~100 mL of 2N NaOH through 1 g of resin over 1 h. The resins were then washed with ~150 mL of deionized water over 1.5 h.

Thermogavimetric analysis (TGA): For VBMO.TMA Cl, the weight loss centered around 5 min (66° C.) was attributed to water evaporation. The weight loss centered around 23 min (244° C.) was found to be due to chloromethane and trimethylamine release. Weight loss centered around 37 min (384° C.) was due to styrene/DVB backbone pyrolysis.

TGA: For VBMO:TMA OH, the weight loss until 6 min (74° C.) is attributed to water evaporation. From then on, trimethylamine is released until around 12 minutes (133° C.). Weight loss centered around 37 min (384° C.) is due to styrene/DVB backbone pyrolysis.

GC-Headspace: It was found that after 4 days, only a few ppm of TMA was generated for both AMBERJET™ 4200Cl and VBMO.TMA Cl. A much more significant amount of TMA was generated when the resins were in the hydroxide form. VBMO:TMA OH, as more of a Type II resin, generated more TMA (~25000 ppm after 2 days), but seemed to stabilize (about the same amount of TMA generated at 2 and 4 days). On the other hand, AMBERJET™ 4200 OH, as a Type I resin, (which is normally more thermally stable than a Type II resin) released less TMA (1000 ppm after 4 days) but did not seem to plateau like VBMO:TMA OH. The same type of behavior was observed at 100° C. with a very significant degradation of AMBERJET™ 4200 OH after 4 days (~12000 ppm of TMA). In contrast, AMBERLITE™ IRA 410OH released about 4500 ppm of dimethylaminoethanol after 4 days.

17. VBMO:TMA Caustic Stability:

AMBERLITE™ IRA 402 AMBERLITE™ IRA 410 and VBMO:TMA were converted to the OH form by passing ~1 L of 2N NaOH in ~30 mL of resin. Deionized water (1 L) was then passed through the resin to wash it (final pH was close to neutral). The resins were then introduced in a 500 mL 3-neck flask and 100 mL of 10 wt % caustic solution was added. The solution was heated up at 100° C. for 12 h, the caustic replaced, and heated again to 100° C. for 6 h. The resins were thoroughly washed with deionized water until neutral pH and then subject to resin capacity testing according to ASTM D2187-94(2009)e1 "Standard Test Methods for Physical and Chemical Properties of Particulate Ion-Exchange Resins". The VBMO:TMA resin lost most of its weight capacity after treatment (Eq OH=0.22 eq/kg and Eq CO3=0.04 eq/kg). Under the same conditions, AMBERLITE™ IRA 402 had an Eq OH=1.12 eq/kg and Eq CO3=0.04 eq/kg. AMBERLITE™ IRA 410 had an Eq OH=0.36 eq/kg and Eq CO3=0.94 eq/kg.

18. Synthesis of VBMO Picolylamine Ion Exchange Resin:

VBMO resin (96% VBMO/4% DVB) (20 mL) was introduced into a glass pressure tube. NMP (40 mL) and 2-aminomethyl pyridine (picolylamine, 36.9 mL, 0.26 mol) were added to the tube. The tube was sealed and left overnight at room temperature to swell the beads and reach equilibrium. The reaction was then run for three days at 60° C. in a water shaker bath. The resin was then recovered by filtration (an increase of resin volume of 20% was seen after reaction of VBMO beads with picolylamine). Once the resin was filtered, it was washed for 1 h at 40° C. in a MeOH/H2O mixture (80/20). The beads were then rinsed in a column with water for a few hours until neutral pH was reached. IR/optical microscopy of the beads were taken.

Application testing: Copper extraction application testing: A solution of CuSO4 (6 g/L) at pH 2 was added to 25 mL of resin and was allowed to equilibrate on a bath shaker at 40° C. overnight. The resin was then rinsed with water, eluted with ammonia and the amount of copper recovered was quantified by UV.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. It will be understood that certain features and sub-combinations are of utility and may be employed without reference to other features and sub-combinations. References to ranges of numerical values expressly include the end points of such ranges.

The invention claimed is:

1. A chelating or ion exchange resin bead having a median particle diameter from 10 to 1000 microns and comprising a macroporous or gel-type crosslinked copolymer comprising epoxide containing structural units represented by Formula (I):

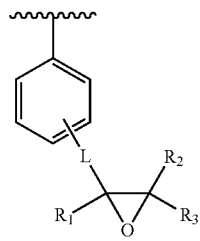

wherein: the epoxide containing group is positioned meta, ortho or para on the ring relative to the bond linkage with the polymer backbone; L is an optional linking group; and $R_1$, $R_2$ and $R_3$ are independently selected from: hydrogen, or a substituted or unsubstituted hydrocarbyl group, and wherein the epoxide containing group is functionalized with an amine or sulfite compound.

2. The resin bead of claim 1 wherein the epoxide containing structural unit is represented by Formula (II):

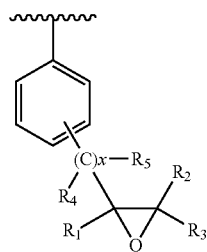

wherein: the epoxide containing group is positioned meta, ortho or para on the ring relative to the bond linkage with the polymer backbone; "x" is an integer from 0 to 9; and $R_1$ through $R_5$ are independently selected from: hydrogen, or a substituted or unsubstituted hydrocarbyl group.

3. The resin bead of claim 2 wherein "x" is 0.

4. The resin bead of claim 2 wherein $R_1$ through $R_5$ are independently selected from: hydrogen; or an unsubstituted alkyl, cycloalkyl or aryl group having from 1 to 9 carbon atoms.

5. The resin bead of claim 1 wherein the amine compound comprises at least one of: 2-picolylamine, bis-(2-picolylamine), N-(2-hydroxyethyl)-2-picolylamine, N-(2-hydroxypropyl)-2-picolylamine, N-methyl-2-picolylamine, and N-(2-methylaminoethyl)-2-picolylamine.

6. A method for making a chelating or ion exchange resin bead having a median particle diameter from 10 to 1000 microns and comprising a macroporous or gel-type crosslinked copolymer comprising the steps of conducting an aqueous suspension polymerization of a reaction mixture comprising: an initiator, a crosslinking monomer and an epoxide containing monomer represented by Formula (III):

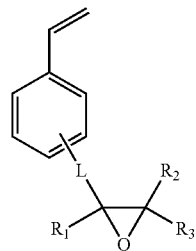

wherein: the epoxide containing group is positioned meta, ortho or para on the ring relative to the vinylidene group; L is an optional linking group; and $R_1$, $R_2$ and $R_3$ are independently selected from: hydrogen, or a substituted or unsubstituted hydrocarbyl group; and
reacting the copolymer with a functionalizing agent selected from an amine or sulfite compound.

7. The method of claim 6 wherein the resin bead is a chelating resin and the amine compound is selected from at least one of: 2-picolylamine, bis-(2-picolylamine), N-(2-hydroxyethyl)-2-picolylamine, N-(2-hydroxypropyl)-2-picolylamine, N-methyl-2-picolylamine, and N-(2-methylaminoethyl)-2-picolylamine.

* * * * *